United States Patent Office

2,828,318
Patented Mar. 25, 1958

2,828,318

PROCESS FOR THE PREPARATION OF ETHYLENE SULFIDE

Delbert D. Reynolds, Rochester, N. Y., assignor to Eastman Kodak Company, Rochester, N. Y., a corporation of New Jersey No Drawing. Application March 21, 1957
Serial No. 647,499

4 Claims. (Cl. 260—327)

This invention concerns a new and improved process for the production of ethylene sulfide.

Ethylene sulfide is known as an important organic intermediate. It polymerizes readily to yield polyethylene sulfide which in turn can be converted to derived polymers. In addition, ethylene sulfide is a useful material for destroying vermin and other noxious organisms when used to prepare insecticides, fungicides, and the like. The use of this material in this manner is described in U. S. Patent 2,094,914, U. S. 2,102,564, and U. S. 2,225,573. In addition, it has been used in numerous synthesis as described in the "Journal of the American Chemical Society," volume 70, page 217 (1948).

Due to the structure of ethylene sulfide

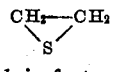

it is highly reactive and, in fact reacts with itself to polymerize easily. Accordingly, when ethylene sulfide is prepared by methods known in the prior art it has been known to polymerize during the course of preparation. For instance, ethylene sulfide may be prepared as follows:

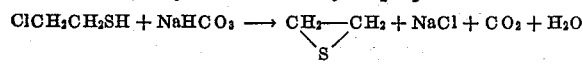

When ethylene sulfide is prepared according to this method it must be separated by fractionation to free it from water. This is difficult to do because of the ease with which it polymerizes. In addition, the 2-chloroethylmercaptan is not readily available.

Other methods of preparing ethylene sulfide are known but some of these either produce small yields or involve difficulties in producing ethylene sulfide without polymerization.

I have now discovered a method whereby ethylene sulfide can be obtained in near quantitative yield by decomposition of a new composition of matter. The reaction is as follows:

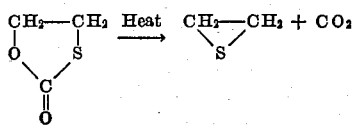

One object of this invention is to provide a method of obtaining pure ethylene sulfide. Another object of this invention is to provide a new composition of matter, monothiolethylene carbonate. Another object of this invention is to provide a method for manufacturing monothiolethylene carbonate.

In carrying out my invention, I react phosgene with 2-mercaptoethanol to obtain a heterocyclic compound, monothiolethylene carbonate. Heating this material causes it to decompose into ethylene sulfide and carbon dioxide.

Monothiolethylene carbonate is a high-boiling, stable liquid compound which can be prepared and kept until the ethylene sulfide is needed; then it is only necessary to heat this intermediate in a suitable apparatus wherein the ethylene sulfide can be collected. Since ethylene sulfide cannot be kept because of its tendency to polymerize, this provides a quick and convenient source for it. In addition, monothiolethylene carbonate will undergo reactions with other compounds. For instance, it will react with amines to yield mercaptoethylurethanes.

The addition of a small amount of an alkaline catalyst, such as sodium carbonate, during the preparation of ethylene sulfide results in a smoother and more rapid decomposition reaction. However, the addition of a small amount of acid such as 1% p-toluene sulfonic acid inhibits the decomposition.

The following examples are intended to illustrate my invention but not to limit it in any way:

*Example 1.—Monothiolethylene carbonate*

One mole (78 g.) of 2-mercaptoethanol, two moles (158 g.) of pyridine and two hundred ml. of ethyl acetate were stirred together in a three-necked flask equipped with a mechanical stirrer, a thermometer and a dropping funnel. With the reaction temperature maintained at 10–20°, a cold solution of 100 g. of phosgene in 300 ml. of ethyl acetate was added dropwise. After all of the phosgene had been added, the ice bath was removed and the reaction mixture was stirred for an additional hour. It was then filtered and the filtrate was washed by stirring with an equal volume of cold water. The ethyl acetate layer was separated and dried over anhydrous magnesium sulfate. After removal of the ethyl acetate by distillation under vacuum while heating on a steam bath the residual product was distilled. The monothiolethylene carbonate distilled at 47–50° at 0.08 mm. Yield 58 g.; $n_D^{25}=1.5092$.

A second fraction was collected at 50–64° at 0.08 mm. Yield 5 g.; $n_D^{25}=1.5089$.

The residue which remained in the distilling flask was a viscous, straw-colored polymer formed by linear rather than cyclic condensation. It weighed 27 g.; $n_D^{25}=1.5392$.

*Example 2.—Monothiolethylene carbonate*

One hundred and fifty-eight grams of pyridine and 300 ml. of ethyl acetate were stirred in the above type apparatus. A solution of 100 g. of phosgene in 300 ml. of ethyl acetate was cooled in a Dry Ice-acetone mixture and 78 g. of 2-mercaptoethanol was added to it. This solution was kept cold and gradually added to the stirred pyridine solution. The reaction temperature was maintained at 15–25°. After all of the phosgene solution had been added, the reaction mixture was stirred for thirty minutes at 35° and then washed up as in the previous example. The yield was 53 g. of monothiolethylene carbonate, $n_D^{27}=1.5107$ and 30 g. of polymeric residue.

*Example 3.—Ethylene sulfide*

Thirty-six grams of monothiolethylene carbonate (Example 1) were placed in a fifty ml. flask with 0.36 g. of anhydrous sodium carbonate and some bumping stones. A still head was attached to the flask so that the ethylene sulfide could be collected. A Dry-Ice trap was attached to the outlet so that the ethylene sulfide which was entrained by the carbon dioxide could be collected. The reaction flask was heated by means of a Glas-Col heater. The decomposition proceeded smoothly to yield of ethylene sulfide (19.0 g.), $n_D^{25}=1.4898$ (88%). There was no polymerization and practically no residue remaining in the flask.

*Example 4.—Ethylene sulfide*

Ten grams of monothiolethylene carbonate (Example 2) were heated as in Example 3 with 0.1 g. of anhydrous sodium carbonate. Yield, 4.8 g.; $n_D^{27}=1.4895$ (83.2%). There was no polymerization.

*Example 5.—Ethylene sulfide*

Ten grams of monothiolethylene carbonate (Example 2) were heated without sodium carbonate. In one case a porous bumping stone was used and in a second case a granite-like bumping stone was added. In the former case 4.6 g. (79.5%) was obtained; $n_D^{27}=1.4895$ and in the latter experiment 4.8 g. (83.2%) having $n_D^{27}=1.4895$ was obtained. There was no polymerization during the preparation.

The temperatures indicated herein are centigrade.

I claim:

1. Monothiolethylene carbonate.
2. A process for the preparation of monothiolethylene carbonate comprising reacting phosgene and 2-mercaptoethanol.
3. A process for the production of ethylene sulfide comprising heating monothiolethylene carbonate until it decomposes.
4. A process for the production of ethylene sulfide comprising reacting phosgene and 2-mercaptoethanol to form monothiolethylene carbonate, followed by heating the monothiolethylene carbonate at its decomposition temperature.

No references cited.